US012802839B2

(12) United States Patent
Tanaka et al.

(10) Patent No.: US 12,802,839 B2
(45) Date of Patent: Nov. 17, 2026

(54) WIRE HARNESS

(71) Applicant: SUMITOMO WIRING SYSTEMS, LTD., Yokkaichi (JP)

(72) Inventors: Yuji Tanaka, Yokkaichi (JP); Shogo Nishiyama, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 204 days.

(21) Appl. No.: 18/835,132

(22) PCT Filed: Feb. 8, 2023

(86) PCT No.: PCT/JP2023/004228
§ 371 (c)(1),
(2) Date: Aug. 1, 2024

(87) PCT Pub. No.: WO2023/157735
PCT Pub. Date: Aug. 24, 2023

(65) Prior Publication Data

US 2025/0140441 A1 May 1, 2025

(30) Foreign Application Priority Data

Feb. 15, 2022 (JP) ................................ 2022-021089

(51) Int. Cl.
*H01B 7/00* (2006.01)
*B60R 16/02* (2006.01)
*H01B 7/40* (2006.01)
*H02G 3/04* (2006.01)

(52) U.S. Cl.
CPC ....... *H01B 7/0045* (2013.01); *B60R 16/0215* (2013.01); *H01B 7/40* (2013.01); *H02G 3/0487* (2013.01)

(58) Field of Classification Search
None
See application file for complete search history.

(56) References Cited

U.S. PATENT DOCUMENTS 1,330,811 A * 2/1920 Konigslow, Sr. .... H02G 3/0481 174/397
2,408,253 A * 9/1946 Diebold .................. H02G 7/00 174/136
5,126,507 A * 6/1992 Kirma ................. H02G 3/0468 174/72 A (Continued)

FOREIGN PATENT DOCUMENTS

JP S50-041120 Y2 11/1975
JP H03-80619 U 8/1991

(Continued)

OTHER PUBLICATIONS

Apr. 18, 2023 Search Report issued in International Patent Application No. PCT/JP2023/004228.

*Primary Examiner* — Krystal Robinson
(74) *Attorney, Agent, or Firm* — Oliff PLC

(57) ABSTRACT

A wire harness configured to be attached to a vehicle, the wire harness includes: a wire; a first route regulator attached to the wire; and a second route regulator attached to the first route regulator, wherein: the first route regulator includes a first body and a first insertion opening, and the second route regulator includes a second body and a second insertion opening.

8 Claims, 3 Drawing Sheets

(56) References Cited

U.S. PATENT DOCUMENTS

| | | | | | |
|---|---|---|---|---|---|
| 5,174,077 | A * | 12/1992 | Murota | F16L 5/04 52/220.8 |
| 5,442,885 | A * | 8/1995 | Laven | E04C 3/07 52/844 |
| 5,560,397 | A * | 10/1996 | Miller | H02G 3/22 138/110 |
| 6,087,593 | A * | 7/2000 | Skipworth | H02G 11/00 174/136 |
| 8,069,623 | B2 * | 12/2011 | Colwell | H02G 3/22 52/220.8 |
| 8,124,887 | B2 * | 2/2012 | Suzuki | H02G 3/0691 174/72 A |
| 10,550,870 | B2 * | 2/2020 | Lewis | F16L 3/13 |
| 10,800,358 | B2 * | 10/2020 | Shimizu | H01R 4/64 |
| D1,012,688 | S * | 1/2024 | Juraga | D19/86 |
| 2003/0029627 | A1 * | 2/2003 | Fatato | F16L 3/26 174/102 D |
| 2008/0121407 | A1 * | 5/2008 | Kassab | H02G 3/0481 174/68.3 |
| 2018/0301242 | A1 * | 10/2018 | Sugino | H05K 9/0098 |
| 2021/0339690 | A1 * | 11/2021 | Kimoto | B60R 16/0215 |
| 2022/0005627 | A1 * | 1/2022 | Kimoto | H01B 7/20 |
| 2023/0166670 | A1 * | 6/2023 | Saito | H02G 3/32 174/72 A |
| 2023/0166674 | A1 * | 6/2023 | Saito | H01B 7/40 174/72 A |
| 2023/0170678 | A1 * | 6/2023 | Saito | H02G 3/0456 174/72 A |

FOREIGN PATENT DOCUMENTS

| | | | |
|---|---|---|---|
| JP | H07-20022 | U | 4/1995 |
| JP | 2006-246663 | A | 9/2006 |
| JP | 2017-084547 | A | 5/2017 |
| JP | 2019-009839 | A | 1/2019 |
| JP | 2020-061822 | A | 4/2020 |

* cited by examiner

WIRE HARNESS

BACKGROUND

The present disclosure relates to a wire harness.

Conventionally, wire harnesses are known that include a wire member and a pipe that covers the outer circumference of the wire member to protect the wire member and regulate a route (see, e.g., JP 2017-84547A).

The pipe disclosed in JP 2017-84547A is formed by a pair of divided parts and can be externally attached to the wire member in a manner such that the wire member is arranged along one of the divided parts and then the divided parts are welded. Accordingly, even if, for example, the pipe is long, the wire harness does not require any troublesome work such as a work of passing a wire through the pipe.

SUMMARY

However, in a wire harness as described above, divided parts need to be welded into one piece and thus, for example, welding equipment is needed, resulting in poor manufacturing performance. Note that it is also conceivable to use a lock structure such as e.g., claws to fix the divided parts to each other, but in this case, the structure of the divided parts will be complicated.

An exemplary aspect of the disclosure provides a wire harness that can protect a wire member and improve manufacturing performance.

According to the present disclosure, a wire harness is configured to be attached to a vehicle, and includes: a wire; a first route regulator attached to the wire; and a second route regulator attached to the first route regulator, wherein: the first route regulator includes: a first body that covers part of an outer circumference of the wire; and a first insertion opening that is formed by two ends of the first body in a circumferential direction and into which the wire is insertable, the first insertion opening being open in a direction orthogonal to a length direction of the first route regulator and extending over the entire first route regulator in the length direction, and the second route regulator includes: a second body that covers part of an outer circumference of the first body and covers the first insertion opening in a manner as to close the first insertion opening, and a second insertion opening that is formed by two ends of the second body in a circumferential direction and into which the first route regulator is insertable, the second insertion opening being open in a direction orthogonal to a length direction of the second route regulator and extending over the entire second route regulator in the length direction.

According to the wire harness of the present disclosure, it is possible to protect a wire member and improve manufacturing performance.

DETAILED DESCRIPTION OF EMBODIMENTS

Description of Embodiment of Present Disclosure

Figure 1:
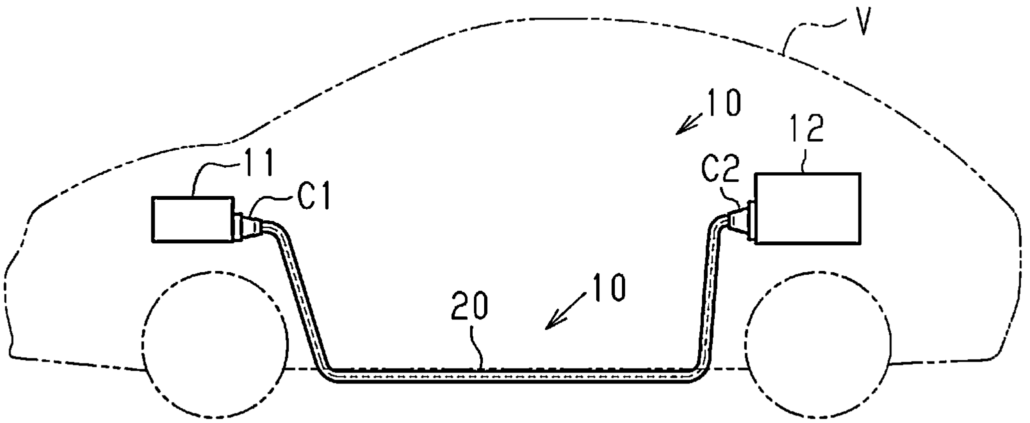
FIG. 1 is a diagram schematically illustrating a configuration of a wire harness according to an embodiment.

First, embodiments of the present disclosure are listed and described.

[1] The wire harness according to the present disclosure is directed to a wire harness configured to be attached to a vehicle, the wire harness including: a wire member; a first route regulating member attached to the wire member; and a second route regulating member attached to the first route regulating member; wherein the first route regulating member includes: a first body portion that covers part of an outer circumference of the wire member; and a first insertion opening that is formed by two end portions of the first body portion in a circumferential direction and into which the wire member is insertable, the first insertion opening being open in a direction orthogonal to a length direction of the first route regulating member and extending over the entire first route regulating member in the length direction, the second route regulating member includes: a second body portion that covers part of an outer circumference of the first body portion and covers the first insertion opening in a manner as to close the first insertion opening, and a second insertion opening that is formed by two end portions of the second body portion in a circumferential direction and into which the first route regulating member is insertable, the second insertion opening being open in a direction orthogonal to a length direction of the second route regulating member and extending over the entire second route regulating member in the length direction.

According to this configuration, part of the outer circumference of the wire member is covered with the first body portion of the first route regulating member. Also, the portion of the outer circumference of the wire member that is not covered with the first body portion and corresponds to the first insertion opening is covered with the second body portion of the second route regulating member. With this, the entire outer circumference of the wire member is covered, so that the wire member is protected and the route is regulated. Also, the first route regulating member can be attached to the wire member through the first insertion opening.

Also, the second route regulating member can be attached to the first route regulating member through the second insertion opening. That is to say, the first route regulating member and the second route regulating member can be easily attached to the wire member externally. Therefore, for example, welding equipment and the like do not need to be used and complicated works of passing the wire member through a pipe do not need to be performed, resulting in excellent manufacturing performance.

[2] Preferably, the second route regulating member is thicker than the first route regulating member, and when the wire harness is attached to the vehicle, the second insertion opening is set so as to be open in a direction opposite to a direction of gravitational force.

According to this configuration, since the second route regulating member, which is thicker than the first route regulating member, is arranged in the direction of gravitational force, when, for example, the wire harness is arranged to pass under the floor of the vehicle, the wire member is less likely to be damaged by flying stones from the ground. Also, since the first route regulating member is thinner than the second route regulating member, it is, for example, easier to save the weight of the wire harness. Accordingly, for example, it is possible to realize the weight saving while maintaining the protective function of the wire member.

[3] Preferably, the first route regulating member is made of resin.

According to this configuration, since the first route regulating member is made of resin, it is possible to achieve weight saving compared to a case where the first route regulating member is made of, for example, metal. Also, the first route regulating member can be manufactured by extrusion molding, which provides excellent manufacturing performance.

[4] preferably, the second route regulating member is made of resin.

According to this configuration, since the second route regulating member is made of resin, it is possible to achieve weight saving compared to a case where the second route regulating member is made of, for example, metal. Also, the second route regulating member can be manufactured by extrusion molding, which provides excellent manufacturing performance.

[5] Preferably, the second route regulating member includes protrusions protruding from the two end portions of the second body portion in the circumferential direction and being in contact with the first route regulating member.

According to this configuration, since the second route regulating member includes the protrusions protruding from the two end portions of the second body portion in the circumferential direction and being in contact with the first route regulating member, it is possible to strongly prevent the second route regulating member from being removed from the first route regulating member via the second insertion opening.

[6] Preferably, the second body portion includes, at a position distanced from the protrusions, a surface contact portion that covers part of the outer circumference of the first body portion and is in surface contact with the part of the outer circumference of the first body portion.

According to this configuration, for example, compared to a configuration in which protrusions are also provided at positions other than the two end portions of the second body portion in the circumferential direction and the second body portion only makes point or line contact with the first body portion, it is possible to reduce the transverse cross-sectional area of the wire harness. This advantageously reduces the routing space of the wire harness.

[7] Preferably, the wire member has a flattened transverse cross-sectional shape, and the first insertion opening and the second insertion opening are open in a short side direction of the transverse cross-sectional shape of the wire member.

According to this configuration, for example, the dimension of the wire harness along the short side direction of the transverse cross-sectional shape of the wire member can be reduced. In other words, it is possible to realize a thinner wire harness. This advantageously reduces the routing space of the wire harness.

[8] preferably, the wire member includes: a wire; and a braided member covering an outer circumference of the wire, wherein the first route regulating member is in direct contact with the braided member to prevent the wire member from moving inside the first route regulating member.

According to this configuration, the wire member is prevented from moving inside the first route regulating member. Accordingly, it is possible to suppress damage to the wire member due to movement of the wire member.

Details of Embodiments of Present Disclosure

The following will describe specific examples of the wire harness according to the present disclosure with reference to the drawings. In the drawings, for ease of description, part of a configuration may be exaggerated or simplified. Furthermore, the dimensional ratios of constituent components may be different between the drawings. Note that the present disclosure is not limited to these examples but is defined by the claims, and all modifications within the meaning and scope equivalent to the claims are intended to be included. In the context of the present specification, the term "orthogonal" includes not only exactly orthogonal, but also substantially orthogonal to the extent that the functions and effects of the embodiments are achieved. Also, the terms "circle" and "arc" in the present specification include not only exact circle and arc, but also approximate circle and arc to the extent that the functions and effects of the embodiments are achieved.

Overall Configuration of Wire Harness 10

The wire harness 10 shown in FIG. 1 electrically connects at least two or three electrical devices to each other. For example, the wire harness 10 electrically connects an inverter 11 disposed in a front portion of a vehicle V such as a hybrid car or an electric car to a high-voltage battery 12 disposed in a rear portion of the vehicle V relative to the inverter 11. The wire harness 10 is routed to pass, for example, under the floor of the vehicle V, or the like. For example, an intermediate portion of the wire harness 10 in the length direction is routed to pass through an area outside the vehicle interior such as an underfloor area of the vehicle V.

The inverter 11 is connected to a not-shown wheel driving motor, which serves as a power source for vehicle driving. The inverter 11 generates AC power from DC power of the high-voltage battery 12 and supplies the AC power to the motor. The high-voltage battery 12 is a battery that can supply a voltage of several hundreds of volts, for example.

Figure 2:
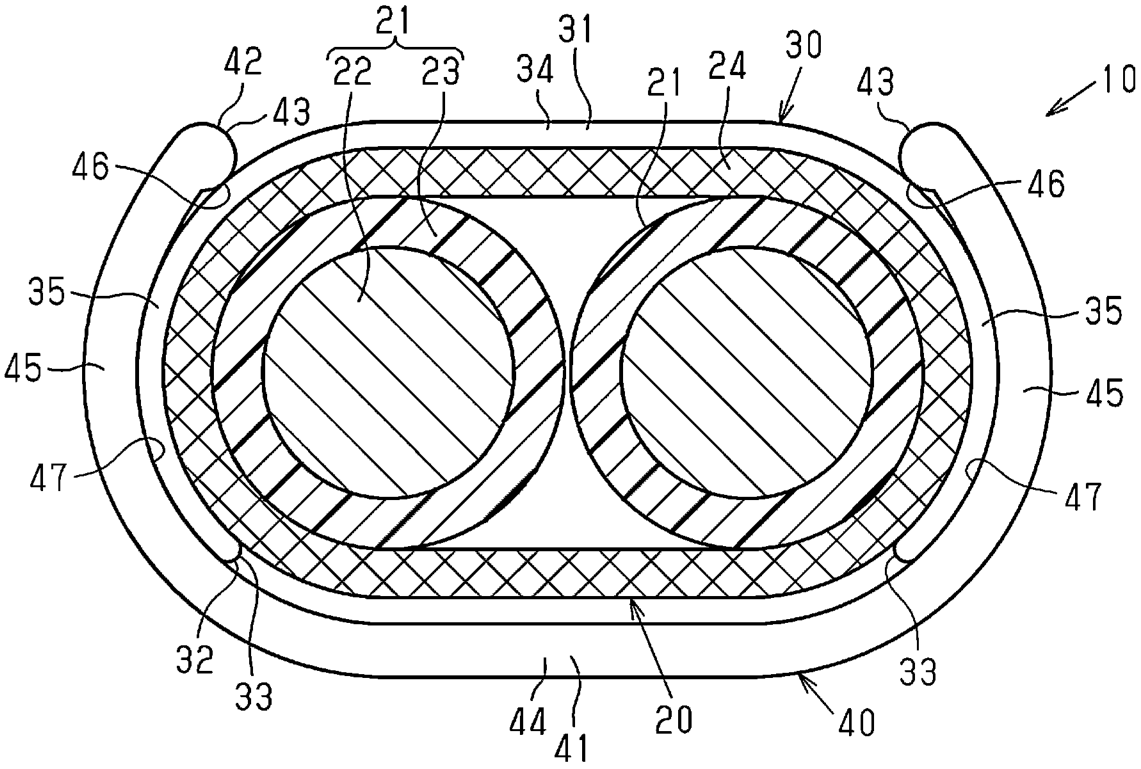
FIG. 2 is a transverse cross-sectional view schematically illustrating the wire harness according to the embodiment.
Figure 3:
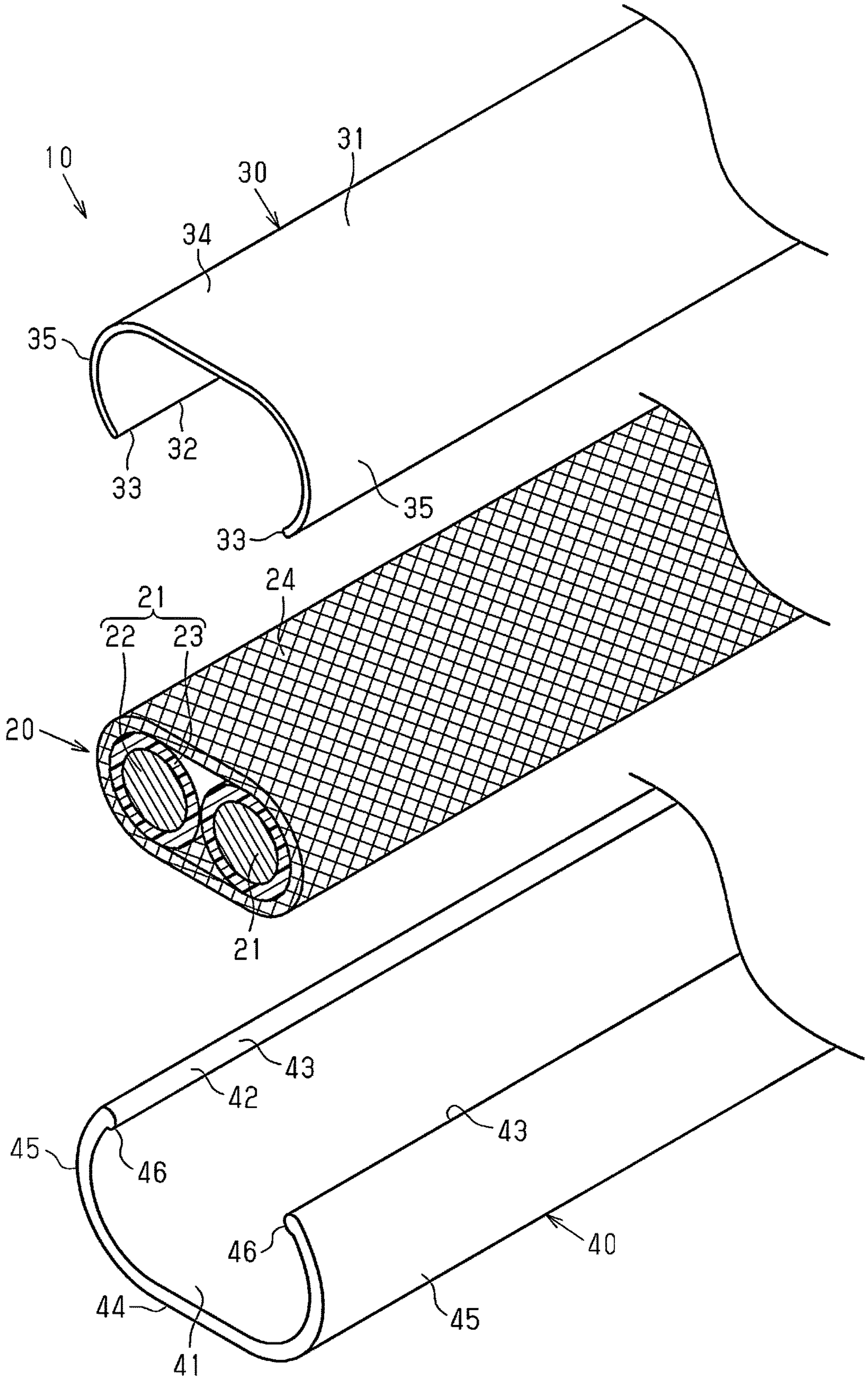
FIG. 3 is a partially exploded perspective view illustrating the wire harness according to the embodiment.

As shown in FIGS. 2 and 3, the wire harness 10 includes a wire member 20 that electrically connects the above-described electrical devices to each other. The wire harness 10 also includes a first route regulating member 30 (first route regulator) attached to the outer circumference of the wire member 20, and a second route regulating member 40 (second route regulator) attached to the outer circumference of the first route regulating member 30. The first route regulating member 30 and the second route regulating member 40 are configured to protect the wire member 20 and regulate the route on which the wire member 20 is routed, for example, under the floor of the vehicle V. The first route regulating member 30 and the second route regulating member 40 function to make the wire member 20 less likely to bend than a wire member 20 to which none of the first route regulating member 30 and the second route regulating member 40 are attached, thereby preventing the wire member 20 from being misaligned.

Configuration of Wire Member 20

The wire member 20 includes at least one wire 21 and a braided member 24 (braid) that collectively covers the outer circumference of the at least one wire 21. The wire member 20 of the present embodiment includes two wires 21. One end portion of the wire member 20 is connected to the inverter 11 via a connector C1, and the other end portion of the wire member 20 is connected to the high-voltage battery 12 via a connector C2. The wire member 20 is elongated and extends in a front-rear direction of the vehicle V, for example. The wire 21 is, for example, a high-voltage wire that can deal with a high voltage and a large current. Note that the wire 21 may be, for example, a non-shielded wire that has not any electromagnetic shielding structure, or a shielded wire that has an electromagnetic shielding structure.

Configuration of Wire 21

Each wire 21 is a coated wire that includes a core wire 22 made of an electrical conductor and an insulating coating 23 that coats the outer circumference of the core wire 22.

Configuration of Core Wire 22

As the core wire 22, for example, a twisted wire obtained by twisting a plurality of metal bare wires together, a columnar conductor made of a single columnar metal rod having a solid internal structure, a tubular conductor having a hollow internal structure, or the like can be used. Also, as the core wire 22, for example, a combination of a multiple types of conductors such as a twisted wire, a columnar conductor, and a tubular conductor can be used. Examples of a columnar conductor may include a single core wire and a bus bar. The core wire 22 of the present embodiment is a twisted wire. As the material of the core wire 22, for example, a metal material such as a copper material or an aluminum material can be used.

The cross-sectional shape (hereinafter, referred to as a transverse cross-sectional shape) of the core wire 22 that is taken along a plane orthogonal to the length direction of the core wire 22, that is, the length direction of the wire 21 can be any shape. The transverse cross-sectional shape of the core wire 22 is, for example, circular, semi-circular, polygonal, square, flattened, or the like. The transverse cross-sectional shape of the core wire 22 of the present embodiment is circular.

Configuration of Insulating Coating 23

The insulating coating 23 coats, for example, the entire outer circumferential surface of the core wire 22. The insulating coating 23 is made of, for example, an insulating material such as a synthetic resin. As the material of the insulating coating 23, a synthetic resin mainly made of a polyolefin resin such as a cross-linked polyethylene or a cross-linked polypropylene can be used, for example. Also, as the material of the insulating coating 23, one type of material may be used alone, or a combination of at least two types of materials may be used as appropriate.

Configuration of Braided Member 24

The braided member 24 has, for example, a tubular shape as a whole that collectively covers the outer circumference of a plurality of wires 21 together. For example, the braided member 24 covers substantially the entire outer circumference of the wires 21 in the length direction of the wires 21. As the braided member 24, braided wires obtained by braiding a plurality of metal bare wires, or braided wires obtained by braiding metal bare wires and resin bare wires in combination can be used. Examples of the material of the metal bare wires can include a metal material such as a copper material or an aluminum material. The braided member 24 is grounded, for example, at the connectors C1 and C2 and the like, although illustration thereof is omitted.

The wire member 20 including two wires 21 and the braided member 24 collectively covering the wires 21 has a flattened transverse cross-sectional shape. Specifically, the transverse cross-sectional shape of the wire member 20 has a flattened shape having a longitudinal direction (left-right direction in FIG. 2) along the direction in which the wires 21 are lined up and a short-side direction (up-down direction in FIG. 2) along the direction that is orthogonal to the longitudinal direction and in which the wires 21 are not lined up.

Configuration of First Route Regulating Member 30

As shown in FIGS. 2 and 3, the first route regulating member 30 is attached to the wire member 20 while covering part of the outer circumference of the wire member 20. The first route regulating member 30 extends in the length direction of the wire member 20. The first route regulating member 30 of the present embodiment is attached to, for example, the outer circumference of a portion of the wire member 20 where, in the wiring route, the wire member 20 extends linearly, such as a portion under the floor of the vehicle V.

The first route regulating member 30 is made of resin. As the material of the first route regulating member 30, for example, a synthetic resin such as polypropylene, polyamide, and polyacetal can be used. The first route regulating member 30 may be manufactured by, for example, a well-known manufacturing method such as extrusion molding and injection molding. The first route regulating member 30 of the present embodiment has a constant transverse cross-sectional shape. The first route regulating member 30 of the present embodiment is an extrusion-molded article manufactured by extrusion molding. Accordingly, the first route regulating member 30 can be easily manufactured using an extrusion molding machine that extrudes the raw material of the first route regulating member 30 in the length direction. Also, using a single extrusion molding machine, multiple types of first route regulating members 30 having different dimensions in the length direction can be manufactured. For example, by cutting the base material of the first route regulating member 30 formed using a single extrusion molding machine in suitable lengths using a cutting machine, multiple types of first route regulating members 30 having different dimensions in the length direction can be manufactured.

The first route regulating member 30 includes a first body portion 31 (first body) and a first insertion opening 32. The first body portion 31 is formed in a manner as to cover part of the outer circumference of the wire member 20. The first body portion 31 is formed in a manner as to cover an area of the outer circumference of the wire member 20 that is larger than one half of the entire circumference of the wire member 20 in the circumferential direction. The first insertion opening 32 is formed by two end portions 33 of the first body portion 31 in the circumferential direction, is open in a direction orthogonal to the length direction of the first route regulating member 30, and extends over the entire first route regulating member 30 in the length direction, so that the wire member 20 can be inserted thereinto. The first insertion opening 32 is open in a short side direction of the transverse cross-sectional shape of the wire member 20. The first body portion 31 of the present embodiment includes a first flat portion 34 that is flat and covers upper portions of two wires 21 lined up in a horizontal direction, and arc-shaped first arc portions 35 that respectively extend from two end portions of the first flat portion 34 and cover side portions of the wires 21, when the wire harness 10 is attached to the vehicle V. Also, the leading ends of the first arc portions 35, which serve as the two end portions 33 of the first body portion 31 in the circumferential direction, form the first insertion opening 32. Also, the first route regulating member 30 is set so that the inner surface of the first body portion 31 is in direct contact with the braided member 24 to prevent the wire member 20 from moving inside the first route regulating member 30.

The opening width of the first insertion opening 32, that is to say, the shortest distance between the two end portions 33 of the first body portion 31 in the circumferential direction, is smaller than the width of the transverse cross-sectional shape of the wire member 20 in the longitudinal direction (left-right direction in FIG. 2).

When inserting the wire member 20 into the first insertion opening 32 in a direction orthogonal to the length direction, the first route regulating member 30 is elastically deformed and the opening width of the first insertion opening 32 is enlarged. When the wire member 20 has been inserted into the first route regulating member 30, the first route regulating member 30 elastically returns to its original shape. Accordingly, the opening width of the first insertion opening 32 is reduced, so that the wire member 20 is accommodated in the first route regulating member 30 and the first route regulating member 30 is attached to the wire member 20.

Configuration of Second Route Regulating Member 40

As shown in FIGS. 2 and 3, the second route regulating member 40 is attached to the first route regulating member 30 while covering part of the outer circumference of the first route regulating member 30. The second route regulating member 40 extends in the length direction of the wire member 20. The second route regulating member 40 of the present embodiment is attached to the same position as the position at which the first route regulating member 30 is provided, for example, to the outer circumference of a portion of the wire member 20 where, in the wiring route, the wire member 20 extends linearly, such as a portion under the floor of the vehicle V.

The second route regulating member 40 is made of resin. As the material of the second route regulating member 40, for example, a synthetic resin such as polypropylene, polyamide, and polyacetal can be used. The second route regulating member 40 may be manufactured by, for example, a well-known manufacturing method such as extrusion molding and injection molding. The second route regulating member 40 of the present embodiment has a constant transverse cross-sectional shape. The second route regulating member 40 of the present embodiment is an extrusion-molded article manufactured by extrusion molding. Accordingly, the second route regulating member 40 can be easily manufactured using an extrusion molding machine that extrudes the raw material of the second route regulating member 40 in the length direction. Also, using a single extrusion molding machine, multiple types of second route regulating members 40 having different dimensions in the length direction can be manufactured. For example, by cutting the base material of the second route regulating member 40 formed using a single extrusion molding machine in suitable lengths using a cutting machine, multiple types of second route regulating members 40 having different dimensions in the length direction can be manufactured.

The second route regulating member 40 includes a second body portion 41 (second body) and a second insertion opening 42. The second body portion 41 covers part of the outer circumference of the first body portion 31 and covers the first insertion opening 32 in a manner as to close the first insertion opening 32. The second insertion opening 42 is formed by two end portions 43 of the second body portion 41 in the circumferential direction, is open in a direction orthogonal to the length direction of the second route regulating member 40, and extends over the entire second route regulating member 40 in the length direction, so that the first route regulating member 30 can be inserted thereinto. The second insertion opening 42 is open in a short side direction of the transverse cross-sectional shape of the wire member 20. The second body portion 41 of the present embodiment includes a second flat portion 44 that is flat and covers lower portions of two wires 21 lined up in a horizontal direction, and arc-shaped second arc portions 45 that respectively extend from two end portions of the second flat portion 44 and cover side portions of the wires 21, when the wire harness 10 is attached to the vehicle V. Also, the leading ends of the second arc portions 45, which serve as the two end portions 43 of the second body portion 41 in the circumferential direction, form the second insertion opening 42. With this, the second insertion opening 42 is set in a manner as to be open in the direction opposite to the direction of gravitational force when the wire harness 10 is attached to the vehicle V. Also, the second route regulating member 40 is thicker than the first route regulating member 30. In other words, the second body portion 41 is thicker than the first body portion 31.

Also, the second route regulating member 40 includes protrusions 46. The protrusions 46 respectively protrude from the two end portions 43 of the second body portion 41 in the circumferential direction and are in contact with the first route regulating member 30. The transverse cross-sectional shape of the protrusions 46 is, for example, a curved shape. The transverse cross-sectional shape of the protrusions 46 of the present embodiment is arc-shaped. The protrusions 46 extends in the length direction of the second route regulating member 40. The protrusions 46 extend, for example, over the entire length of the second route regulating member 40 in the length direction.

The protrusions 46 press the first route regulating member 30 from the outside. The protrusions 46 of the present embodiment are in contact with the first arc portions 35 of the first body portion 31 and press the first arc portions 35 from the outside. The second route regulating member 40 is attached to the first route regulating member 30 while elastically holding the first route regulating member 30 using the second body portion 41 and the protrusions 46.

Also, the second body portion 41 includes, at positions distanced from the protrusions 46, surface contact portions 47 that respectively cover portions of the outer circumference of the first body portion 31 and are in surface contact with the portions of the outer circumference of the first body portion 31. In other words, the second body portion 41 does not have any protrusion except for those at the two end portions 43 of the second body portion 41 in the circumferential direction, and the second arc portions 45 at the positions distanced from the respective protrusions 46 serve as the surface contact portions 47 that are in surface contact with the first arc portions 35.

The opening width of the second insertion opening 42, that is to say, the shortest distance between the two end portions 43 of the second body portion 41 in the circumferential direction, is smaller than the width of the transverse cross-sectional shape of the first body portion 31 in the longitudinal direction (left-right direction in FIG. 2).

When inserting the first route regulating member 30 attached to the wire member 20 into the second insertion opening 42 in a direction orthogonal to the length direction, the second route regulating member 40 is elastically deformed and the opening width of the second insertion opening 42 is enlarged. When the first route regulating member 30 has been inserted into the second route regulating member 40, the second route regulating member 40 elastically returns to its original shape. Accordingly, the opening width of the second insertion opening 42 is reduced, so that the first route regulating member 30 is accommodated in the second route regulating member 40 and the second route regulating member 40 is attached to the first route regulating member 30. The following will describe effects of the present embodiment.

According to the wire harness 10 of the present embodiment, the first route regulating member 30 can be attached to the wire member 20 afterward through the first insertion opening 32. In other words, the first route regulating member 30 can be attached to the wire member 20 in a direction orthogonal to the length direction of the wire member 20. Also, the second route regulating member 40 can be attached to the first route regulating member 30 afterward through the second insertion opening 42. In other words, the second route regulating member 40 can be attached to the first route regulating member 30 in a direction orthogonal to the length direction of the first route regulating member 30. Accordingly, for example, after the connectors C1 and C2 have been attached to both end portions of the wire member 20, the first route regulating member 30 and the second route regulating member 40 can be attached to the wire member 20 afterward.

At a position at which the first route regulating member 30 and the second route regulating member 40 are attached to the wire member 20, for example, a collision of a foreign object with the wire member 20 is prevented, and the wire harness 10 is suppressed from being bent even if vibration or some kind of external force is applied to the position.

The following will describe effects of the present embodiment.

(1) Part of the outer circumference of the wire member 20 is covered with the first body portion 31 of the first route regulating member 30. Also, the portion of the outer circumference of the wire member 20 that is not covered with the first body portion 31 and corresponds to the first insertion opening 32 is covered with the second body portion 41 of the second route regulating member 40. With this, the entire outer circumference of the wire member 20 is covered, so that the wire member 20 is protected and the route is regulated. Also, the first route regulating member 30 can be attached to the wire member 20 through the first insertion opening 32. Also, the second route regulating member 40 can be attached to the first route regulating member 30 through the second insertion opening 42. That is to say, the first route regulating member 30 and the second route regulating member 40 can be easily attached to the wire member 20 externally. Therefore, for example, welding equipment and the like do not need to be used and complicated works of passing the wire member 20 through the pipe do not need to be performed, resulting in excellent manufacturing performance.

(2) Since the second route regulating member 40, which is thicker than the first route regulating member 30, is arranged in the direction of gravitational force, when, for example, the wire harness 10 is arranged to pass under the floor of the vehicle V, the wire member 20 is less likely to be damaged by flying stones from the ground. Also, since the first route regulating member 30 is thinner than the second route regulating member 40, it is, for example, easier to save the weight of the wire harness 10. Accordingly, for example, it is possible to realize the weight saving while maintaining the protective function of the wire member 20.

(3) Since the first route regulating member 30 is made of resin, it is possible to achieve weight saving compared to a case where the first route regulating member 30 is made of, for example, metal. Also, the first route regulating member 30 can be manufactured by extrusion molding, which provides excellent manufacturing performance.

(4) Since the second route regulating member 40 is made of resin, it is possible to achieve weight saving compared to a case where the second route regulating member 40 is made of, for example, metal. Also, the second route regulating member 40 can be manufactured by extrusion molding, which provides excellent manufacturing performance.

(5) Since the second route regulating member 40 includes the protrusions 46 that protrude from the two end portions 43 of the second body portion 41 in the circumferential direction and are in contact with the first route regulating member 30, it is possible to strongly prevent the second route regulating member 40 from being removed from the first route regulating member 30 via the second insertion opening 42.

(6) The second body portion 41 includes, at positions distanced from the protrusions 46, the surface contact portions 47 that cover portions of the outer circumference of the first body portion 31 and are in surface contact with the portions of the outer circumference of the first body portion 31. Accordingly, for example, compared to a configuration in which protrusions are also provided at positions other than the two end portions 43 of the second body portion 41 in the circumferential direction and the second body portion 41 only makes point or line contact with the first body portion 31, it is possible to reduce the transverse cross-sectional area of the wire harness 10. This advantageously reduces the routing space of the wire harness 10.

(7) The wire member 20 has a flattened transverse cross-sectional shape, and the first insertion opening 32 and the second insertion opening 42 are open in the short side direction of the transverse cross-sectional shape of the wire member 20. Accordingly, for example, the dimension of the wire harness 10 along the short side direction of the transverse cross-sectional shape of the wire member 20 can be reduced. In other words, it is possible to realize a thinner wire harness 10. This advantageously reduces the routing space of the wire harness 10.

(8) The wire member 20 includes the wire 21 and the braided member 24 that covers the outer circumference of the wire 21, and has a configuration in which the first route regulating member 30 is in direct contact with the braided member 24 to prevent the wire member 20 from moving inside the first route regulating member 30. Accordingly, the wire member 20, more specifically, the wire 21 and the braided member 24 are prevented from moving inside the first route regulating member 30. Accordingly, it is possible to suppress damage to the wire member 20 due to movement of the wire member 20.

Modifications

The present embodiment can be implemented in the following modifications. The present embodiment and the following modifications can be implemented in combinations to the extent that they do not technically inconsistent.

Although the protrusions 46 of the above-described embodiment are in contact with the first arc portions 35 of the first body portion 31, the present disclosure is not limited to this, and a configuration is also possible in which the protrusions 46 are in contact with other portions.

Figure 4:
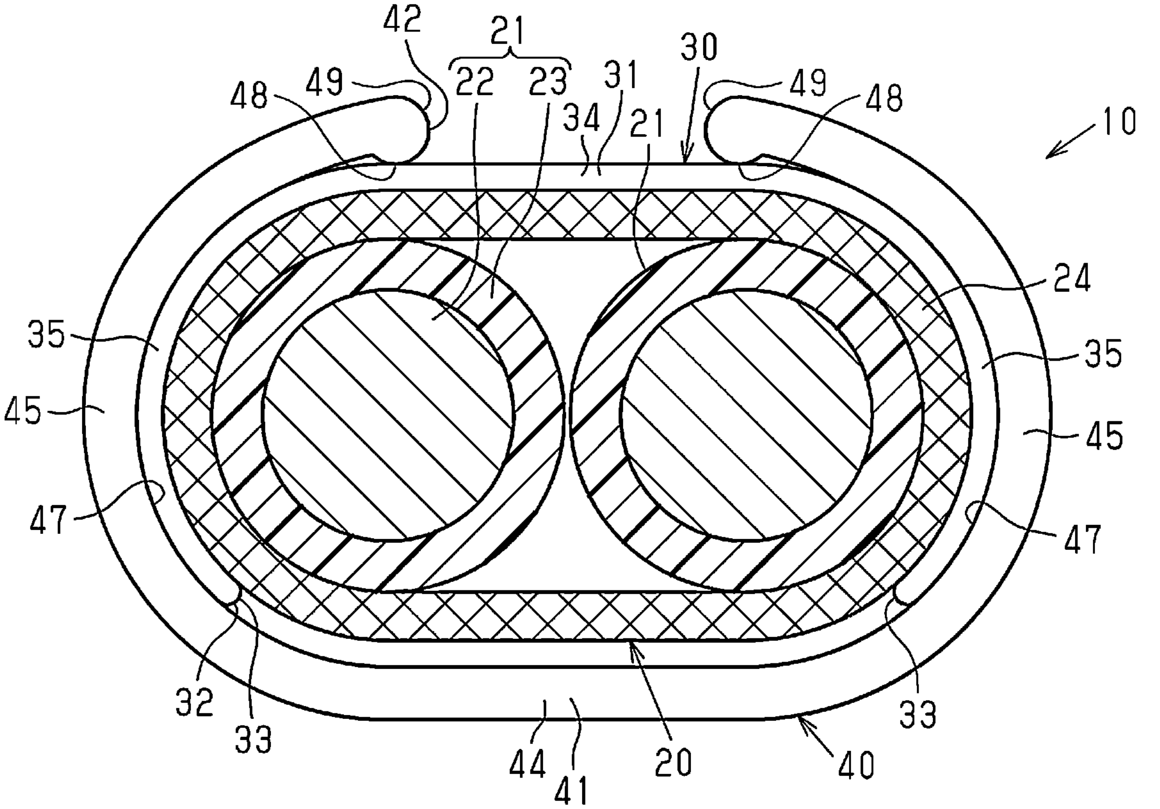
FIG. 4 is a transverse cross-sectional view schematically illustrating a wire harness according to another embodiment.

For example, as shown in FIG. 4, a configuration is also possible in which protrusions 48 of the second route regulating member 40 are in contact with the first flat portion 34 of the first body portion 31. In other words, in this example, two end portions 49 of the second body portion 41 extend to positions facing the first flat portion 34, and the protrusions 48 protrude from these two end portions 49.

Although in the above-described embodiment, the second route regulating member 40 is thicker than the first route regulating member 30, the present disclosure is not limited to this, and the second route regulating member 40 may be thinner than the first route regulating member 30 or may have the same thickness as that of the first route regulating member 30. Also, the thickness of the first route regulating member 30 may vary from site to site. Also, the thickness of the second route regulating member 40 may vary from site to site.

Although in the above-described embodiment, the first route regulating member 30 is made of resin, the present disclosure is not limited to this, and the first route regulating member 30 may also be made of metal. For example, the first route regulating member 30 may be made of a metal material such as an iron material, a copper material, or an aluminum material. When the first route regulating member 30 is made of metal in this manner, it is possible to prevent an increase in temperature of the wire member 20 when, for example, it is disposed at a position close to the heat source of the vehicle V.

Although in the above-described embodiment, the second route regulating member 40 is made of resin, the present disclosure is not limited to this, and the second route regulating member 40 may also be made of metal. For example, the second route regulating member 40 may be made of a metal material such as an iron material, a copper material, or an aluminum material. When the second route regulating member 40 is made of metal in this manner, it is possible to prevent an increase in temperature of the wire member 20 when, for example, it is disposed at a position close to the heat source of the vehicle V.

Although in the above-described embodiment, the second route regulating member 40 includes the protrusions 46 that protrude from the two end portions 43 of the second body portion 41 in the circumferential direction and are in contact with the first route regulating member 30, the present disclosure is not limited to this, and a configuration is also possible in which the second route regulating member 40 does not include such protrusions 46. A configuration is also possible in which the second route regulating member 40 include protrusions that protrude from positions other than the two end portions 43 of the second body portion 41 in the circumferential direction and are in contact with the first route regulating member 30. Also, the protrusions 46 may be provided locally on the second route regulating member 40 in the length direction.

Although in the above-described embodiment, the second body portion 41 includes the surface contact portions 47 that are in contact with part of the outer circumference of the first body portion 31, the present disclosure is not limited to this, and a configuration is also possible in which the second body portion 41 does not include such surface contact portions 47.

Although in the above-described embodiment, the wire member 20 has a flattened transverse cross-sectional shape, the present disclosure is not limited to this, and a configuration is also possible in which the wire member 20 has another transverse cross-sectional shape such as a circular transverse cross-sectional shape, for example. Note that, in this case, the number of wires 21 included in the wire member 20 may be changed to one, or three or more. Also, in this case, the shapes of the first route regulating member 30 and the second route regulating member 40 may preferably be changed according to the shape of the wire member.

Although, in the above-described embodiment, the first insertion opening 32 and the second insertion opening 42 are open in the short side direction of the transverse cross-sectional shape of the wire member 20, the present disclosure is not limited to this, and a configuration is also possible in which they are open in the longitudinal direction of the transverse cross-sectional shape of the wire member 20, for example.

Although, in the above-described embodiment, the wire member 20 includes the braided member 24, the present disclosure is not limited to this, and a configuration is also possible in which the wire member 20 does not include such a braided member 24.

Although, in the above-described embodiment, the wire member 20 includes the braided member 24 at the outermost position, the present disclosure is not limited to this, and a configuration is also possible in which the wire member 20 includes another exterior member at the outermost position, for example.

Although, in the above-described embodiment, the first route regulating member 30 is in direct contact with the braided member 24 to prevent the wire member 20 from moving inside the first route regulating member 30, the present disclosure is not limited to this, and a configuration is also possible in which the first route regulating member 30 is not in direct contact with the braided member 24.

The first route regulating member 30 and the second route regulating member 40 of the above-described embodiment are not limited to those adapted to be provided under the floor of the vehicle V. The first route regulating member 30 and the second route regulating member 40 may be provided, for example, in the vehicle interior of the vehicle V as long as they are disposed in a straight portion of the wiring route of the wire member 20.

The first route regulating member 30 may be referred to as a radially-inward route regulating member or a small-diameter route regulating member, and the second route regulating member 40 may be referred to as a radially-outward route regulating member or a large diameter route regulating member.

As shown in FIGS. 2 to 4, the first route regulating member 30 includes a predetermined length profile, which may be a straight profile, and a predetermined cross-sectional profile, which may be a C-shaped cross-sectional profile, and may be attached to the outer circumferential surface of the wire member 20, for example, by snap-fit, to regulate the longitudinal shape of the wire harness 10.

As shown in FIGS. 2 to 4, the second route regulating member 40 includes a predetermined length profile, which may be a straight profile, and a predetermined cross-sectional profile, which may be a C-shaped cross-sectional profile, and may be attached to the outer circumferential surface of the first route regulating member 30 in a direction opposite to the direction of attaching the first route regulating member 30, for example, by snap-fit to regulate the longitudinal shape of the wire harness 10.

As shown in FIGS. 2 and 4, in the transverse cross-sectional view of the first route regulating member 30, the first route regulating member 30 may have a constant thickness in the radial direction over the entirety thereof, and may have a smooth radially-outward surface and a smooth radially-inward surface. The pair of protrusions 46 of the second route regulating member 40 may protrude radially inward from the two end portions 43 of the second route regulating member 40 in the circumferential direction. The radially-inward surface of the second route regulating member 40 may have convex curved surfaces forming the respective protrusions 46, and a radially-inward smooth surface that is continuous with the two protrusions 46 and extends between the two protrusions 46. The convex curved surface may be a convex curved end edge having a relatively small radius of curvature. The radially-inward smooth surface may include two concave curved surfaces, each having a relatively large radius of curvature, and a flat surface that is continuous with the two concave curved surfaces and extends between the two concave curved surfaces. The inner surface, e.g., the entire inner surface, of the first route regulating member 30 may be in surface contact with the outer circumferential surface of the wire member 20. When the second route regulating member 40 is attached to the first route regulating member 30, the radially-inward surface of the second route regulating member 40 may be in surface contact with the radially-outward surface of the first route regulating member 30 between the pair of protrusions 46 of the second route regulating member 40 and the respective two end portions of the first route regulating member 30 in the circumferential direction, except for the boundary between the radially-inward smooth surface of the second route regulating member 40 and the protrusions 46 (convex curved surfaces).

As shown in the cross-sectional view of FIG. 2, the end portions 43 of the second route regulating member 40 may be located at the uppermost position of the second route regulating member 40 when the wire harness 10 is attached to the vehicle. In the cross-sectional view, the end portions 43 of the second route regulating member 40 may match the uppermost position of the wire member 20, which may be a position on the outer surface of the wire member 20, or as shown in FIG. 4, the uppermost position of the second route regulating member 40 may be located at a higher level than the uppermost position of the wire member 20.

The invention claimed is:

1. A wire harness configured to be attached to a vehicle, the wire harness comprising:

a wire;

a first route regulator attached to the wire; and a second route regulator attached to the first route regulator, wherein:

the first route regulator includes:

a first body that covers part of an outer circumference of the wire; and a first insertion opening that is formed by two ends of the first body in a circumferential direction and into which the wire is insertable, the first insertion opening being open in a direction orthogonal to a length direction of the first route regulator and extending over the entire first route regulator in the length direction, and the second route regulator includes:

a second body that covers part of an outer circumference of the first body and covers the first insertion opening in a manner as to close the first insertion opening, and a second insertion opening that is formed by two ends of the second body in a circumferential direction and into which the first route regulator is insertable, the second insertion opening being open in a direction orthogonal to a length direction of the second route regulator and extending over the entire second route regulator in the length direction, wherein:

the wire includes a plurality of core wires that are lined up along a linear direction, so that the wire has a flattened transverse cross-sectional shape with its longitudinal direction being the linear direction, the first insertion opening and the second insertion opening are respectively open toward opposite directions along a short-side direction of the flattened transverse cross-sectional shape, the short-side direction being orthogonal to the longitudinal direction of the flattened transverse cross-sectional shape.

2. The wire harness according to claim 1, wherein:

the second route regulator is thicker than the first route regulator, and when the wire harness is attached to the vehicle, the second insertion opening is set so as to be open in a direction opposite to a direction of gravitational force.

3. The wire harness according to claim 1, wherein the first route regulator is made of resin.

4. The wire harness according to claim 1, wherein the second route regulator is made of resin.

5. The wire harness according to claim 1, wherein the second route regulator includes protrusions protruding from the two ends of the second body in the circumferential direction and being in contact with the first route regulator.

6. The wire harness according to claim 5, wherein the second body includes, at a position distanced from the protrusions, a surface contact portion that covers part of the outer circumference of the first body and is in surface contact with the part of the outer circumference of the first body.

7. The wire harness according to claim 1, wherein:

a braid covers an outer circumference of the wire, and the first route regulator is in direct contact with the braid to prevent the wire from moving inside the first route regulator.

8. The wire harness according to claim 1, wherein:

the second route regulator includes protrusions protruding radially inward from the two ends of the second body, a radially innermost end of each of the protrusions contacts an outer surface of the first body, and an inner surface of the second body adjacent each of the protrusions is spaced apart from the outer surface of the first body.

* * * * *